Patented July 31, 1945

2,380,621

UNITED STATES PATENT OFFICE 2,380,621

COLORLESS, AQUEOUS SOLUTIONS OF VITA-MIN-K-ACTIVE COMPOUNDS AND PROCESS FOR THE MANUFACTURE OF SAME

Kurt Warnat, Basel, Switzerland, assignor to Hoffmann-La Roche Inc., Nutley, N. J., a corporation of New Jersey No Drawing. Application September 16, 1943, Serial No. 502,704. In Switzerland March 3, 1942

3 Claims. (Cl. 260—461)

It has been found that colorless, aqueous solutions of vitamin-K-active compounds, for instance for ampuls, can be manufactured in the following manner: The crude 2-methyl-1,4-dihydroxy-naphthalene-diphosphoric-acid - tetra - chloride, obtained by condensation of 2-methyl-1,4-dihydroxy-naphthalene with phosphorous oxy-chloride, is hydrolised with water in the presence of a base; the inorganic phosphates are precipitated by the addition of a calcium compound; the solution freed from phosphates is heated to boiling, and the precipitated 2-methyl-1,4-dihydroxy - naphthalene - diphosphoric-acid-dicalcium salt, if desired, is transformed into other salts by known methods. The aqueous solutions obtained may be filled into ampuls directly or, if desired, the salts can be precipitated from the solution and then re-dissolved in water.

The salts obtained according to the present process are, without further purification, sufficiently pure for direct use in therapy.

Example 1

A solution of 10 parts by weight of 2-methyl-1,4-dihydroxy-naphthalene in 100 parts by weight of pyridine is added to 150 parts by weight of phosphorus oxy-chloride while cooling thoroughly. After completion of the reaction, the diphosphoric-acid-dichloride is separated from the precipitated pyridine hydrochloride by extraction with benzene. The benzene solution is concentrated in vacuo and the residue, without further purification, is hydrolised carefully with water containing sodium hydroxide. The neutral solution is mixed with a solution of 20 parts by weight of calcium chloride, the total volume amounting to about 300 to 500 parts by volume. The calcium phosphate deposited is filtered off and the clear filtrate is heated to boiling, whereupon the calcium salt of 2-methyl-1,4-dihydroxy-naphthalene-diphosphoric-acid precipitates in the form of a heavy, sandy powder. It is filtered off while still hot and washed with hot water.

The salt has the formula

$C_{11}H_8O_8P_2Ca_2 \cdot 4H_2O$ part of the water of crystallisation escapes easily even at room temperature. It dissolves more easily in cold than in warm water and can be used directly for the preparation of solutions for ampuls.

Example 2

To a well stirred mixture of 170 parts by weight of phosphorus oxy-chloride and 40 parts by weight of toluene a suspension of 17.4 parts by weight of 2-methyl-1,4-dihydroxy-naphthalene in 50 parts by weight of dimethyl-aniline and 150 parts by weight of toluene is added while cooling. After completion of the reaction the excess phosphoric oxy-chloride and toluene are distilled off in vacuo. The residue is hydrolised by the addition of water at a temperature of about 20-30° C. The aqueous solution is neutralised by the addition of sodium carbonate and inorganic phosphates are precipitated by the addition of 40 parts by weight of calcium chloride. The phosphate-precipitate is filtered off and the filtrate amounting to a volume of about 500 to 1000 parts by volume is heated to boiling. The calcium salt is obtained in a yield of at least 80% of the theoretical.

Example 3

17.4 parts by weight of 2-methyl-1,4-dihydroxy-naphthalene are condensed as described in Example 2. After driving off the excess phosphorous oxy-chloride and the toluene, the crude diphosphoric-acid-dichloride is hydrolised with water while adding calcium hydroxide. Inorganic phosphates and the dimethyl-aniline precipitated are separated off, and the aqueous solution is heated to boiling.

Example 4

20 parts by weight of the calcium salt of 2-methyl - 1,4 - dihydroxy - naphthalene - diphosphoric-acid, manufactured according to Examples 1-3, are dissolved in 500 parts by weight of water at about 10° C. Oxalic acid and sodium hydroxide are added until a pH of about 6-7 is reached and until a sample of the filtrate is free from calcium- and oxalic-acid. Then the calcium oxalate is filtered off. The solution of the sodium salt obtained can directly be used for injection purposes.

The sodium salt can be obtained in crystalline form by carefully concentrating the filtrate in vacuo to a small volume, bringing the pH to about 8, and adding alcohol until an oil separates. Upon rubbing with a glass-rod, and, if necessary, addition of seed crystals, the oil soon crystallises. The crystallisation is completed by the addition of more alcohol. If necessary, the salt can be purified by dissolving in water and recrystallising by the addition of alcohol. When the salt is dried exposed to air it contains 12 molecules of crystallisation water. The salt is not hygroscopic. For injection purposes the aqueous solution thereof can be filled into ampuls, the operation being carried out in an atmosphere of an inert gas if desired.

I claim:

1. In the process for the manufacture of water-soluble salts of 2-methyl-1,4-dihydroxy-naphthalene diphosphoric acid the steps which comprise hydrolyzing crude 2-methyl-1,4-dihydroxy-naphthalene-diphosphoric acid tetrachloride with water in the presence of a base, removing from the solution thus obtained any free phosphoric acid present therein by adding a calcium compound forming calcium phosphate with the free acid, and boiling the solution freed from calcium phosphate in the presence of a calcium compound precipitating the calcium salt of 2-methyl-1,4-dihydroxy-naphthalene diphosphoric acid from the boiling liquid.

2. In the process for the manufacture of water-soluble salts of 2-methyl-1,4-dihydroxy-naphthalene diphosphoric acid the steps which comprise hydrolyzing crude 2-methyl-1,4-dihydroxy-naphthalene diphosphoric acid tetrachloride with water in the presence of calcium hydroxide, separating any calcium phosphate precipitated in the resulting solution, and boiling the solution in the presence of a calcium compound precipitating the calcium salt of 2-methyl-1,4-dihydroxy-naphthalene diphosphoric acid from the boiling liquid.

3. In the process for the manufacture of water-soluble salts of 2-methyl-1,4-dihydroxy-naphthalene diphosphoric acid the steps which comprise hydrolyzing crude 2-methyl-1,4-dihydroxy naphthalene diphosphoric acid tetrachloride with water containing sodium hydroxide, mixing the neutral solution with an aqueous solution of calcium hydroxide in an amount whereby any free phosphoric acid present in the solution is precipitated as calcium phosphate, and the calcium salt of 2-methyl-1,4-dihydroxy-naphthalene diphosphoric acid is precipitated from the solution freed from calcium phosphate upon boiling.

KURT WARNAT.